(12) United States Patent
Øllgaard

(10) Patent No.: US 7,735,289 B2
(45) Date of Patent: Jun. 15, 2010

(54) WIND TURBINE TOWER SUSPENSION ARRANGEMENT

(75) Inventor: Børge Øllgaard, Esbjerg (DK)

(73) Assignee: Vestas Womd Systems A/S, Randers SV (DK)

( * ) Notice: Subject to any disclaimer, the term of this patent is extended or adjusted under 35 U.S.C. 154(b) by 1434 days.

(21) Appl. No.: 10/480,018

(22) PCT Filed: May 9, 2003

(86) PCT No.: PCT/DK03/00308

§ 371 (c)(1),
(2), (4) Date: Aug. 3, 2004

(87) PCT Pub. No.: WO2004/099609

PCT Pub. Date: Nov. 18, 2004

(65) Prior Publication Data

US 2004/0244326 A1    Dec. 9, 2004

Related U.S. Application Data

(63) Continuation-in-part of application No. 10/157,286, filed on May 29, 2002, now abandoned.

(51) Int. Cl.
*E04B 1/18* (2006.01)
(52) U.S. Cl. .......................... 52/633; 52/843; 52/651.01
(58) Field of Classification Search ............ 52/DIG. 4, 52/633, 651.01, 651.07, 651.1, 843; 403/410; 248/206.5
See application file for complete search history.

(56) References Cited

U.S. PATENT DOCUMENTS

| 2,977,082 A | 3/1961 | Harris |
| 3,051,875 A | 8/1962 | Farwell |
| 3,100,275 A | 8/1963 | Gantz |

(Continued)

FOREIGN PATENT DOCUMENTS

DE            101 44 206         4/2003

(Continued)

OTHER PUBLICATIONS

International Search Report; PCT/DK03/00308; Nov. 6, 2003.

(Continued)

*Primary Examiner*—Basil Katcheves
(74) *Attorney, Agent, or Firm*—Wood, Herron & Evans, L.L.P.

(57) ABSTRACT

The invention relates to a wind turbine tower suspension arrangement
including at least one first member including magnetic attachment means and at least one further mechanical member mechanically coupled to the first member by at least one coupling means,
the coupling means providing at least one degree of freedom between the magnetic attachment means and the at least one further member.

According to an embodiment of the invention, mutually displacement in at least direction may be absorbed or damped without transferring the invoking force into the magnetic attachment means.

17 Claims, 8 Drawing Sheets

U.S. PATENT DOCUMENTS

| | | | |
|---|---|---|---|
| 3,109,619 A | 11/1963 | Krug | |
| 3,230,653 A | 1/1966 | Rice | |
| 3,239,179 A | 3/1966 | Margulis | |
| 3,924,117 A * | 12/1975 | Brindley | 362/191 |
| 4,026,086 A | 5/1977 | Langley | |
| 4,272,929 A | 6/1981 | Hanson | |
| 4,601,754 A | 7/1986 | Ghandehari | |
| 5,192,155 A * | 3/1993 | Meyer | 403/410 |
| 5,411,231 A | 5/1995 | Buck | |
| 5,746,329 A | 5/1998 | Rondeau | |
| 5,816,548 A | 10/1998 | Blossom, III | |
| 6,470,645 B1 | 10/2002 | Maliszewski | |
| 2001/0004819 A1 | 6/2001 | Reymann | |
| 2002/0012582 A1 | 1/2002 | Kirkegaard et al. | |
| 2002/0025220 A1 | 2/2002 | Okuda | |
| 2002/0151824 A1 | 10/2002 | Fischer | |
| 2002/0175251 A1 | 11/2002 | Robinson | |
| 2003/0147753 A1 | 8/2003 | Ollgaard | |

FOREIGN PATENT DOCUMENTS

| | | |
|---|---|---|
| GB | 2 238 173 | 5/1991 |
| WO | WO 00 36724 | 6/2000 |
| WO | WO 02 38953 | 5/2002 |

OTHER PUBLICATIONS

International Search Report; PCT/DK03/00073; May 15, 2003.

* cited by examiner

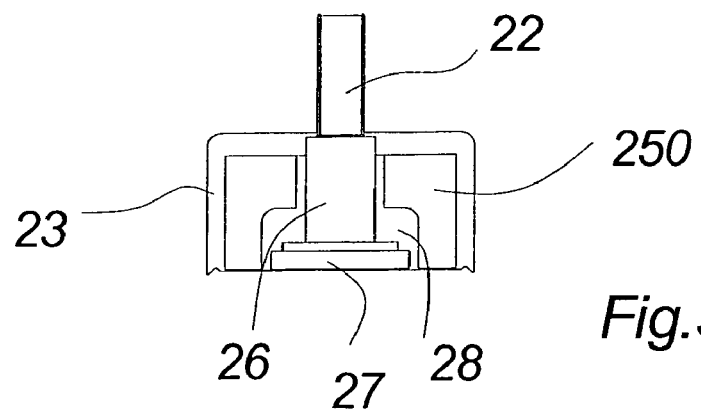
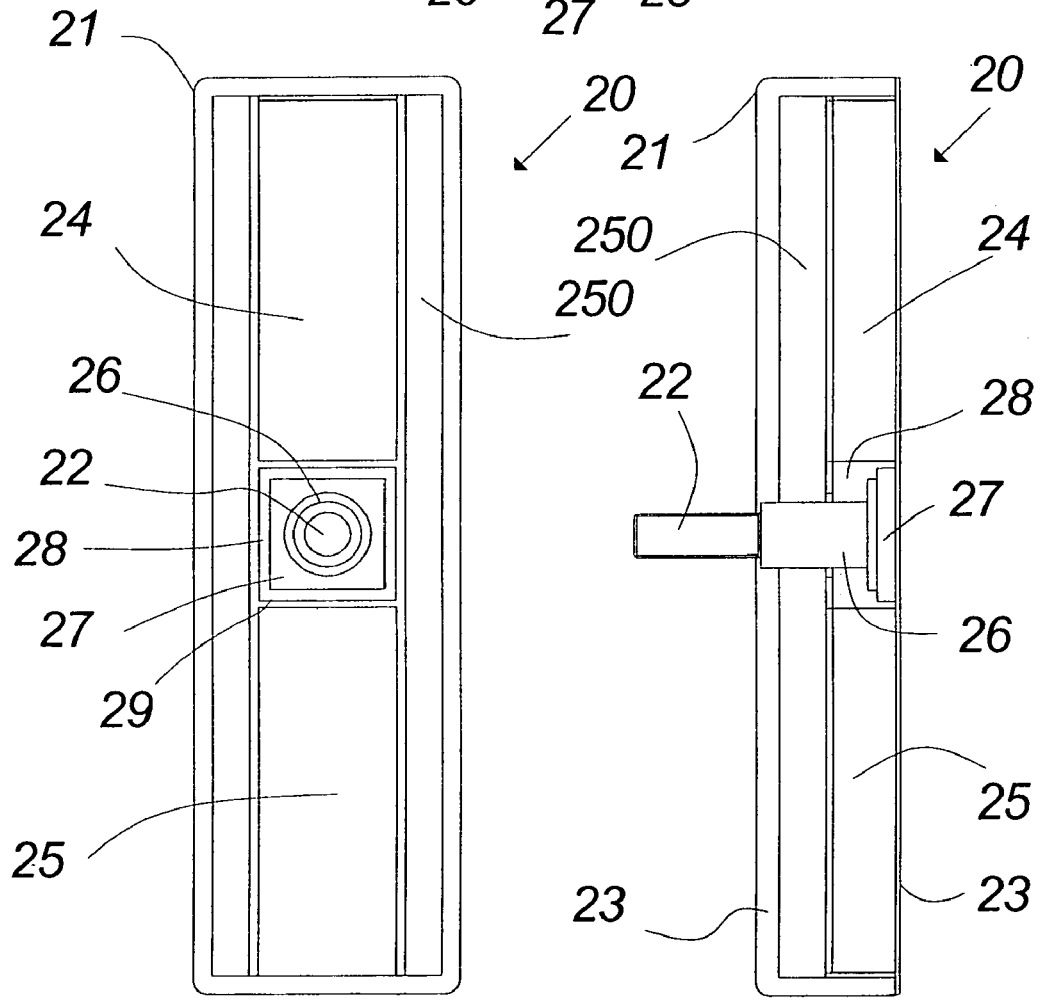
Fig. 3c
Fig. 3a
Fig. 3b

WIND TURBINE TOWER SUSPENSION ARRANGEMENT

CROSS REFERENCE TO RELATED APPLICATION

This application is a continuation-in-part of U.S. patent application Ser. No. 10/157,286 filed on May 29, 2002, now abandoned which is herein incorporated by reference in its entirety.

FIELD OF THE INVENTION

The present invention relates to a method of mounting elements in a wind turbine tower.

BACKGROUND OF THE INVENTION

Typically, wind turbine towers carry the nacelle and the rotor of a wind turbine in order to allow for the desired rotation of the rotor and to raise the rotor into a position as far as possible from the ground as wind speeds typically increase with the distance to the ground.

A wind turbine tower may be constructed according to several different principles, e.g. as tubular steel towers, lattice towers or even concrete towers.

Most large wind turbines are delivered with tubular steel towers manufactured in sections of 20-30 meters with flanges at both ends, and bolted together on the site. The towers are typically conical in order to increase strength and save materials at the same time.

The steel towers typically comprise an interior with platforms, ladders, illumination means, power cables, lifts, etc. The components are welded to the inner surface of the steel tower section, or directly attached to the fittings, which have been welded and/or bolted to the tower.

One of several problems associated with the above-described wind turbine towers is that the welding or bolting of especially the interior tower components such as ladders, cables, etc., weaken the tower structure.

In some cases it is possible to compensate for this problem by taking relatively costly precautions.

SUMMARY OF THE INVENTION

The invention relates to a wind turbine tower suspension arrangement comprising at least one first member comprising magnetic attachment means and at least one further mechanical member being mechanically coupled to said first member by means of at least one coupling means, said coupling means providing at least one degree of freedom between said magnetic attachment means and said at least one further member.

According to an embodiment of the invention, mutually displacement in at least one direction may be absorbed or damped without transferring the invoking force into the magnetic attachment means. In this way, the invention provides an optimization of the attachment provided by the magnetic attachment means, due to the fact that forces having a direction to which the magnetic attachment may be weak, may be absorbed or damped in the coupling. Preferably and generally the invention deals with permanent suspension of elements and structures within a wind turbine tower. In other words, the elements suspended according to the invention are preferably intended to be permanently positioned.

In an embodiment of the invention, at least one degree of freedom is substantially fixed. Thus, while accepting a certain degree of freedom with respect to movement, at least one degree of freedom should be substantially fixed, thereby facilitating a substantially rigid suspension via the coupling between the first and the further member in at least one direction. This direction is typically in the normal direction, i.e. in the direction in which the magnetic forces between the magnetic attachment means and the foundation are strongest.

In an embodiment of the invention, said coupling means comprising at least one hinged connection.

In an embodiment of the invention, the coupling means comprises vibration-absorbing means. According to an advantageous embodiment of the invention, the vibration absorbing means should absorb vibrations, e.g. in the form of periodically-like vibrations, impulses or transients, thereby protecting the attachment during use. Evidently, this is important when vibrations are invoked during use of elements attached to the wind turbine tower.

In an embodiment of the invention, the vibration-absorbing means comprises at least one elastic/resilient member. According to the invention an elastic/resilient member represents a structure, which will return to its original shape after being deformed, stretched or compressed. Typically, such member will inherit these properties in a reversible way, although a certain minimal irreversibility may occur due to material hysteresis.

In an embodiment of the invention, the vibration-absorbing means comprises at least one mass.

In an embodiment of the invention, the vibration-absorbing means comprises at least one damper. According to the invention, a damper comprises an element, which will induce loss of kinetic energy when the element is activated. Almost any structure facilitating the desired properties with respect to movement of the further member relative to the first member may be designed by means of serial or parallel combinations of the three elements: mass, damper and spring (analogies).

In an embodiment of the invention, the first member, the coupling means and the further member form a single suspension unit. According to an advantageous embodiment of the invention, the suspension arrangement may form one single unit, which may be mounted on the tower wall simply by positioning the unit at the desired position.

In an embodiment of the invention, the suspension unit comprises a fitting. According to an advantageous embodiment of the invention, the unit is also mounted with a fitting to which a mechanical structure may be fitted.

In an embodiment of the invention, the magnetic attachment means comprise a permanent magnetic material.

In an embodiment of the invention, the permanent magnetic material comprises permanent Neodym magnets.

In an embodiment of the invention, the permanent magnetic material comprises permanent Samarium-Cobalt magnets.

In an embodiment of the invention, the wind turbine tower suspension arrangement comprises mechanical fixating means.

In an embodiment of the invention, the wind turbine tower suspension arrangement comprises at least one barrier encapsulating said magnetic attachment means completely or partly.

In an embodiment of the invention, the wind turbine tower suspension arrangement and wherein the barrier prevents transportation of humidity to the magnetic means.

In an embodiment of the invention, the wind turbine tower suspension arrangement comprises means for receiving mechanical attraction forces in at least one first direction ($d3$) and means for establishment of magnetic attraction forces in at least one other direction (d1), said at least one other direction (d1) being substantially transverse in relation to said at least one first direction.

In an embodiment of the invention, the wind turbine tower suspension arrangement comprises ladder-fixating means, a further advantageous embodiment of the invention has been obtained.

In an embodiment of the invention, the wind turbine tower suspension arrangement comprises platform-fixating means, a further advantageous embodiment of the invention has been obtained.

In an embodiment of the invention, the wind turbine tower suspension arrangement comprises cable-fixating means, a further advantageous embodiment of the invention has been obtained.

In an embodiment of the invention, the wind turbine tower suspension arrangement comprises illumination means, a further advantageous embodiment of the invention has been obtained.

Moreover, the invention relates to a method of mounting elements in a wind turbine tower, whereby said elements are partly or completely attached to the wind turbine tower by means of magnetic attraction forces and where said elements are coupled to the wind turbine tower via a coupling means having at least one degree of freedom. According to the invention, a method implying at least one degree of freedom with respect to mutually movement or displacement facilitates an improved magnetic attraction by the magnetic attachment means to the foundation, i.e. the wind turbine tower, due to the fact that the distance between the magnet(s) providing the magnetic forces needed for the attachment may be uniform over the at least a part of, preferably all, the area of the magnets. In this aspect it should be noted that the non-uniform distribution of the distance from the magnet to the magnetic foundation very likely will decrease the effective magnetic attraction between the attachment means and the foundation.

In an embodiment of the invention, said magnetic attraction forces are established by means of permanent magnetic materials interacting with other magnetic materials.

In an embodiment of the invention, said magnetic attraction forces is provided by at least one first member comprising magnetic attachment means, whereby said elements may be fitted to at least one further mechanical member being mechanically coupled to said first member by means of at least one coupling means said coupling means providing at least one degree of freedom between said magnetic attachment means and said at least one further member In an embodiment of the invention, said at least one degree of freedom facilitates an optimized and uniform distribution of magnetic attraction forces between the permanent magnetic materials and the wind turbine tower.

In an embodiment of the invention, the at least one degree of freedom is limited to a certain mutual displacement or inclining between said at least one first member and said at least one further member.

In an embodiment of the invention, said magnetic attraction forces are established by means of permanent magnetic materials being comprised in a suspension unit and interacting with other magnetic materials forming at least a portion of a wind turbine tower.

In an embodiment of the invention, said magnetic attraction forces are supplemented by mechanical fixation in at least one direction.

In an embodiment of the invention, said mechanical fixation in at least one direction is established by mechanical fixation to fixation areas, said fixation areas being arranged at a certain distance from each other in the vertical direction of a wind turbine tower.

In an embodiment of the invention, said mechanical fixation in at least one direction is established by mechanical fixation to fixation areas, said fixation areas being arranged at a certain distance from each other in the vertical direction of a wind turbine tower, said distances approximately constituting the vertical length of a wind turbine tower section.

In an embodiment of the invention, said fixation areas comprise flanges adapted to joining the wind turbine tower sections.

In an embodiment of the invention, the elements comprise ladders or parts of ladders.

In an embodiment of the invention, the elements comprise cables or parts of cables.

In an embodiment of the invention, the elements comprise illuminations means.

In an embodiment of the invention, the elements comprise elements required in the interior of the wind turbine tower.

In an embodiment of the invention, the elements are suspended by means of at least one wind turbine tower suspension unit.

In an embodiment of the invention, the wind turbine tower suspension unit comprises magnetic attachment means.

In an embodiment of the invention, the magnetic attachment means comprise a permanent magnetic material.

In an embodiment of the invention, the permanent magnetic material comprises permanent Neodym magnets.

In an embodiment of the invention, the permanent magnetic material comprises permanent Samarium-Cobalt magnets.

In an embodiment of the invention, the wind turbine tower suspension unit comprises mechanical fixating means.

In an embodiment of the invention, the wind turbine tower suspension unit comprises at least one barrier encapsulating said magnetic attachment means completely or partly.

In an embodiment of the invention, said barrier prevents transportation of humidity to the magnetic means.

In an embodiment of the invention, the unit comprises means for receiving mechanical attraction forces in at least one first direction and means for establishment of magnetic attraction forces in at least one other direction, said at least one other direction being substantially transverse in relation to said at least one first direction.

In an embodiment of the invention, said at least one degree of freedom is substantially non-parallel to the main direction of said magnetic attraction forces with respect to movement.

In an embodiment of the invention, said at least one degree of freedom is adapted for absorbing or damping vibrations induced into said at least one further member.

BRIEF DESCRIPTION OF THE FIGURES

The invention will now be described in detail with reference to the drawings, in which FIG. 3a illustrates a cross-sectional view of the magnetic suspension unit of FIG. 2a as seen from above, FIG. 3b illustrates a cross-sectional side view of the magnetic suspension unit of FIG. 2a, FIG. 3c illustrates a cross-section of the magnetic suspension of FIG. 2a as seen from the end, FIG. 4 illustrates the basic dynamic functionality of the suspension unit of FIG. 2a, FIG. 5 illustrates a feature of the suspension of FIG. 2a.

DETAILED DESCRIPTION

Most large wind turbines are delivered with tubular steel towers manufactured in sections of 20-30 meters with flanges at both ends, and bolted together on the site. The towers are conical (i.e. the diameter increases towards the base) in order to increase strength and save materials at the same time.

The production costs of the wind turbine towers are relatively high compared with the manufacturing costs of the complete wind turbine construction. Moreover, these costs increase proportionately with the height and especially if it exceeds around fifty meters. It is therefore quite important with respect to the final cost of energy to build towers as optimally as possible.

Figure 1:
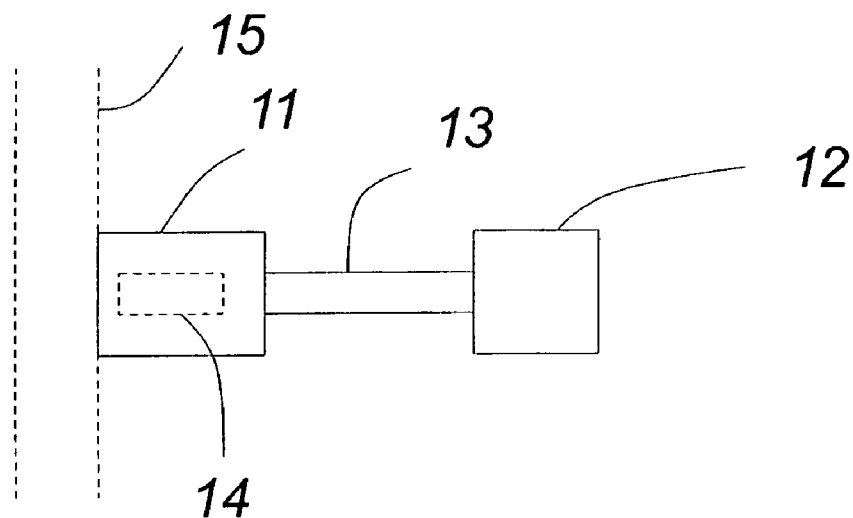
FIG. 1 illustrates the properties of an embodiment of the invention.

FIG. 1 illustrates some basic principles of an embodiment of the invention. The illustrated wind turbine tower suspension comprises a first member 11 is coupled to a further member 12 by means of a coupling means 13.

The first member 11 comprises magnetic attachment means 14, preferably a permanent magnet. The first member 11 may be magnetically attached to a foundation 15, in this case a wind turbine tower. Other mechanical structures (not shown) may be fixated to the further member 12, thereby obtaining a fixation of these structures to the foundation 15 via the coupling means 13 and the first member 11.

The coupling means 13 comprises a structure enabling a relative movement in at least one degree of freedom between the first member 11 and the further member 12. The coupling means may e.g. comprise elements or combinations of resilient or elastic elements, dampers and masses. In other words, movement of the mechanical structure(s) attached to the further member may be absorbed by means of the coupling means in at least one direction. This important feature strengthens the magnetic attachment of the first member to the foundation significantly.

It should be noted that the coupling means may be comprised of one single coupling means or it may comprise several mutually coupled elements. The form of the coupling means may also vary significantly as well and the functional elements may be distributed physically near to or in distance from the first member. Likewise, the first member may comprise a single mechanical structure or for example comprise several distributed elements. The further member 12 may comprise fittings (not shown). Example of other structures may e.g. comprise ladders, light armatures, cable fixations means, etc. When the first member 11 is attached to the foundation 15 wholly or at least partly by means of magnetically forces, the coupling means may protect the magnetically applied attachment between the first member and the foundation. In particular, the weakest parts of the attachment may benefit significantly of the coupling means inserted between the magnetic attachment provided by the first member and the further member, to which further mechanical structures may be fitted. In other words, the coupling means 13 should be designed in such a way that movement and/or forces invoked to the further member 12 are damped and/or absorbed by means of the coupling.

As the wind turbine tower suspension is applied for attachment of certain necessary or advantageous structures to the wind turbine tower, it is very important that the coupling means is designed to absorb or damp movements or forces induced to the suspension e.g. when a person climbs a ladder suspended according to the invention thereby protecting or strengthening the desired attachment provided by the above-described first member 11.

Another type of undesired load potentially weakening the magnetic attachment is a more static load applied to the first member 11, when a mechanical structure is fitted to the member 11.

Both above-mentioned loads, a dynamic or a static load, may result in a complete weakening of the magnetic attachment to the wind turbine tower resulting in that the first member is disconnected to the foundation and the effect of both types of loads may be effectively reduced or counteracted according to the provisions of the invention.

Different embodiments of the invention will be described below dealing with especially one or both of the above-described problems.

Figures 2A, 2B:
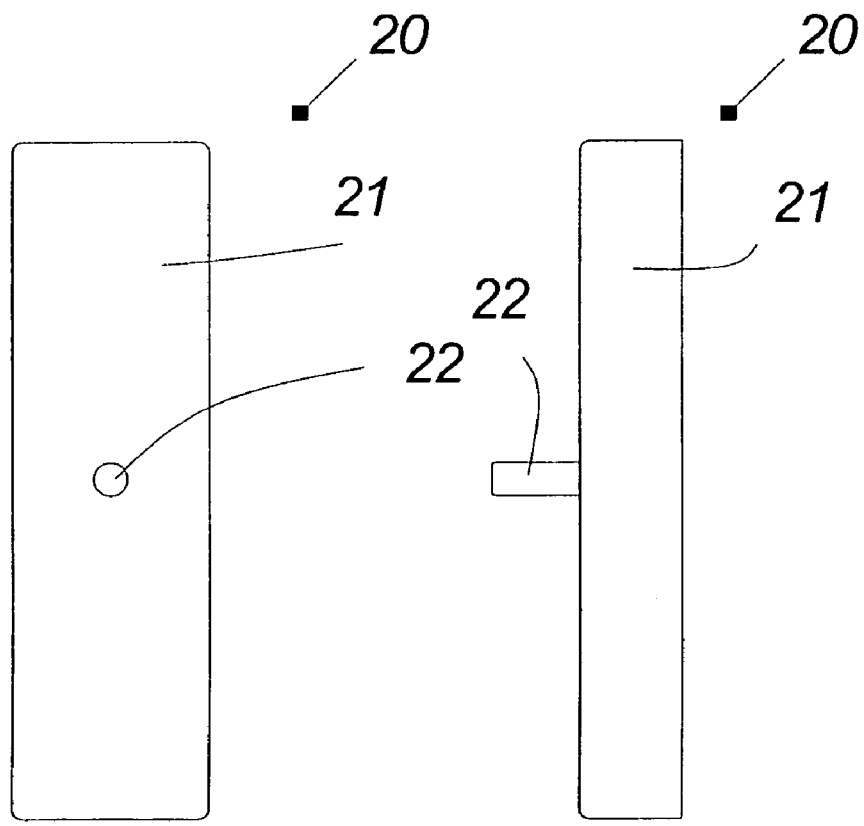
FIG. 2a illustrates a side view of a magnetic suspension unit according to an embodiment of the invention.
FIG. 2b illustrates the suspension unit of FIG. 1a as seen from above.

FIGS. 2a and 2b illustrate a hybrid suspension dealing with both the above-described problems.

FIG. 2a illustrates a suspension unit 20 as seen from above.

The illustrated and preferred embodiment of the invention comprises a main body 21 comprising a fitting 22 to which mechanical structures may be fitted.

FIG. 2b illustrates the suspension as seen from the side.

FIGS. 3a, 3b and 3c show cross-sections of the above-described suspension 20 as seen from above, the side and the end, respectively.

FIG. 3a illustrates a wind turbine tower suspension unit 20 comprising a main body 21 and a mechanically connectable member or section 22 to which mechanical structures may be fixated by suitable fixation means.

The dimensions of the main body 21 of the illustrated unit may e.g. be approximately 200 mm×50 mm×25 mm and the weight may be approximately ½ kilogram.

The unit comprises two magnets 24, 25. The magnets are permanent magnets. Evidently, according to the invention, the magnets may comprise almost any number of magnets grouped and arranged suitably according to the overall design principles.

The characteristics of the magnet(s) will be described in detail subsequently.

The magnets 24, 25 are encapsulated by a barrier material 23 of e.g. rubber. Advantageously, the barrier material should feature a relatively high friction coefficient, thereby maximizing the transversal conservative forces between the unit and the tower inner surface when the unit is attached to an inner surface by magnetic force in the usual directions, here primarily expressed as normal forces.

The barrier material protects the magnet from humidity and dust, thereby preventing corrosion or other physical degradation of the magnet. Moreover, a mechanically connectable member or section 22 is secured to the main body of the unit 20 via a coupling according to the invention. In the present application, the magnet and the member or section 22 extend to the exterior of the unit and form a bolt, e.g. M10×30, at the end. The bolt 22 may be fitted to a suitable nut, thereby providing fixation of a suitable fitting to the unit. Note that the lower part of the rubber sealing is quite thin in order to obtain the strongest possible attraction forces.

The illustrated suspension unit 20 comprises a U-shaped steel cover 250 arranged to be in galvanic contact with the permanent magnets 24, 25, e.g. Neodym. The complete assembly, with the exception of the fitting 22, is encapsulated within a barrier material as described above, thereby providing airtight and waterproof enclosure around the magnet 24, 25 once it is mounted. The U-shape of the magnet provides an improved magnetic coupling means to the underlying surface. Moreover, the U-shape forms a very advantageous structure for holding the magnets together in one solid unit. Evidently, other standard types of magnet configurations may be applied within the scope of the invention.

The fitting 22, a bolt, forms part of a base structure comprising a base portion 26 comprising an end portion 27. The base portion 26 is anchored within the mean body 21 of the suspension unit in a resilient material 28, e.g. rubber. The base portion 22 is anchored in the U-shaped steel cover 250 and projecting through the cover via an opening 29.

With the terms introduced in FIG. 1, the sealed main body 21 and the magnets 24, 25 comprises the first member 11, the rigid structure comprising the bolt 22, the base portion 26 and the end portion 27 comprises the further member 12 and the resilient material 28 forms the coupling means 13.

In short, the illustrated embodiment of the invention facilitates a certain degree of freedom with respect to movement of the bolt 22 in several directions, limited by the nature of the resilient material 28 and the geometrical arranging of the further member comprising the bolt 22, base portion 26 and the end portion 27 within the main body 21.

Different natures of those movements and the properties with respect to impulse and transient absorption/damping will be described below.

Figure 4:
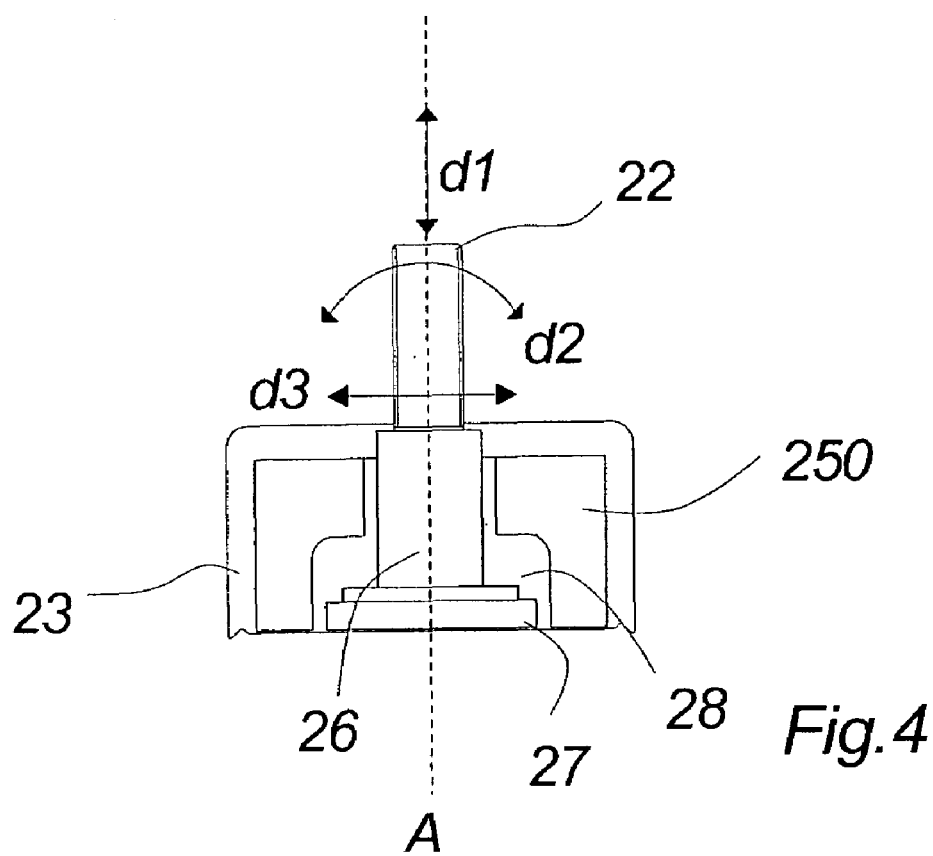

FIG. 4 illustrates the basic dynamic functionality of the already described suspension unit of FIG. 2a and FIG. 3c.

The illustrated cross-section in FIG. 4 corresponds to the illustrated cross section in FIG. 3c.

The rigid structure forming the further member 22, 26, 27 is movable in several directions due to the elasticity of the resilient coupling means 28 with respect to the first member 23, 250, e.g. when the member is fixated magnetically to a foundation (not shown). It should be noted that the first member might of course be slightly movable with respect to the foundation, here due to the resiliency of the encapsulation forming the contact area between the first member 22, 26, 27 and the foundation.

The resilient coupling means 28 enables a certain degree of freedom with respect to movement of the further member, especially in the direction d1 parallel with direction of the axis A of the further member 22, 26, 27. The movement in the direction d1 is restricted outwardly, i.e. away from the foundation (illustrated as 15 in FIG. 1) by the U-shaped part of the main body 250 in combination with the end portion 27 of the base portion 26. Inwardly, the movement in the direction d1 is restricted by the end portion 27 when the unit is mounted at a wall of a wind turbine tower.

Moreover, the illustrated further member is movable in a direction d2 enabling a degree of rotational displacement between the first member 250, 23 and the further member 22, 26, 27.

Also, a degree of freedom is obtained in a direction d3 substantially transverse to the axis A.

Also, a degree of freedom is obtained in a direction (not shown) defining a rotation around the axis A.

In summary, the design should facilitate a certain degree of freedom with respect to movement of the further member 22, 26, 27 while maintaining a for the purpose strong attachment between the first member 250, 23 and the foundation to which it is attached, between the further member 22, 26, 27 and the first member 250, 23 and between the further member 22, 26, 27 and the mechanical structure coupled thereto.

Evidently, suspensions according to the invention may define several other combinations of degrees of freedom.

A small inclination is very often staticly induced in the illustrated direction d2 (or in one of the other directions) when a mechanical structure is fitted to the suspension. The further member 22, 26, 27 should be able to perform a displacement during such fitting and more or less remain in this position in the rest of its lifetime. Preferably, the static adaptation of the suspension to the permanent relative positioning of the first and further member should also absorb or adapt to dynamic vibrations, e.g. in the form of transients or impulses induced during use of the suspension, e.g. invoked when a person is climbing a ladder suspended to the wind turbine tower wholly or partly by the suspension.

Figure 5:
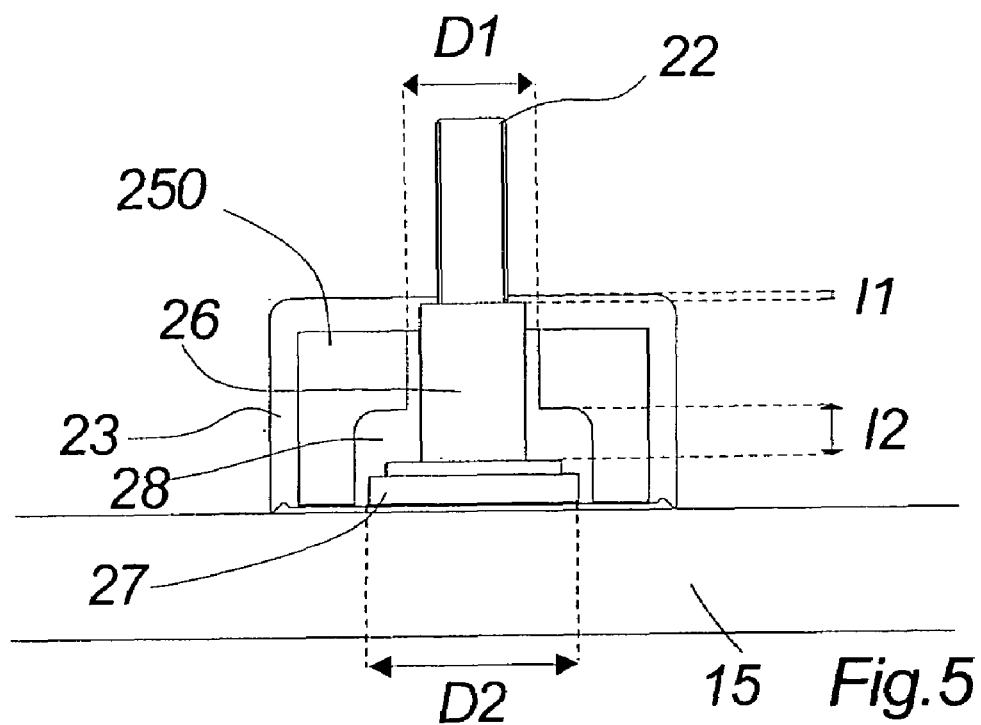

FIG. 5 illustrates further features of the suspension of FIG. 2a.

As mentioned above, the further member comprised by the elements 22, 26, 27 should be sufficiently anchored to the first member 250, 23 to avoid the further member is simply released by the coupling means.

Due to the relatively weak structure of the illustrated resilient coupling means itself, the anchoring is secured as described in the following.

Basically, as mentioned above, the rear part of the further member, i.e. the end portion 27, ensures that the further member is not displaced further than the surface of the foundation 15 permits, when high pressure is applied towards the foundation via the first member 250, 23.

Also, as mentioned above, the rear part of the further member, i.e. the end portion 27 ensures that the tensile forces do not pull the further member out of the main body. This is ensured, as illustrated in FIG. 5, by letting the extension D2 of the end portion 27 being greater the extension D1 of the opening 29 formed in the main body A further feature of the suspension of FIG. 5 is illustrated by the fact that distance 11, i.e. the thickness of the resilient material on top of the base portion 26 is smaller than the distance 12 between the end portion 27 and the lower part of the U-shaped steel member.

This feature minimizes the risk that a mechanical structure (not shown) may be fitted to the bolt 22 by very strong connection forces without restricting the mobility of the further member within the main body of the first member.

The distance 12 of the illustrated embodiment must be sufficiently large enough to ensure that the desired degree of displacement may be obtained.

Figure 6:
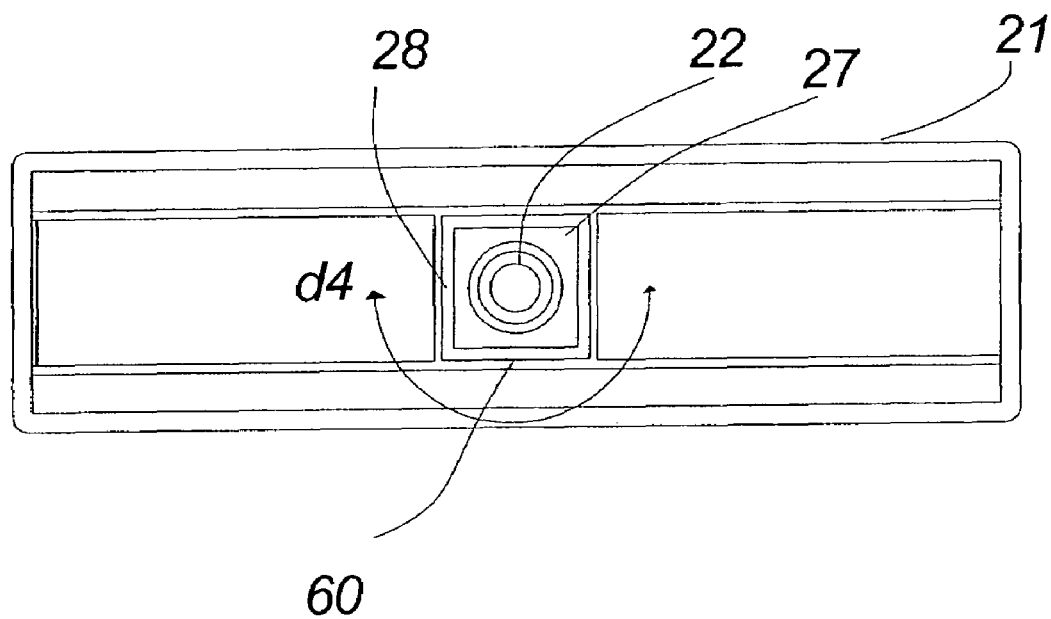
FIG. 6 illustrates a further feature of the invention.

FIG. 6 illustrates a further feature of an embodiment of the, as seen from above.

The end portion 27 of the further member is geometrically formed and positioned in a thereto-adapted cradle 60 in the main body 21 of the suspension so that the end portion restricts the freedom of the rotation of the further member along its axis in the direction d4. This is rather important if the upper part of the further member 12 comprises a bolt 22 to which a nut (not shown) may be fastened by rotational relative movement. Evidently, the coupling means 28 according to the invention should be strong enough to restrict or counteract such forces.

FIGS. 7a to 7f illustrate different variants of the suspension within the scope of the invention.

All of the main bodies of the below-described suspension unit or arrangements comprise magnetic attachment means.

Figure 7A:
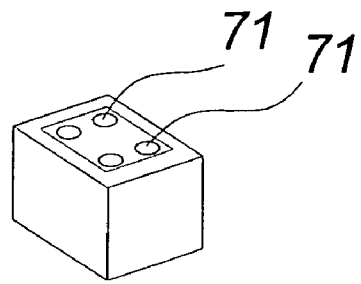
FIG. 7a-7f illustrate different variants of the suspension within the scope of the invention.

FIG. 7a illustrates a simple box-like suspension according to the invention. The illustrated embodiment features four screw-hole threads 71, each being suspended in the main body, so as to permit at least one degree of freedom with respect to movement.

Figure 7B:
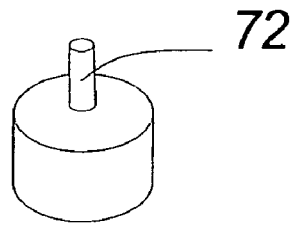

FIG. 7b illustrates a further one-point suspension comprising a bolt 72 suspended by means of a coupling means to the main body of the suspension unit.

Figure 7C:
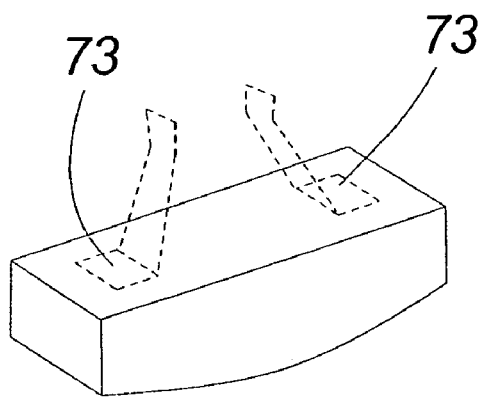

FIG. 7c illustrates a further two-point suspension comprising two bolts 73 suspended by means of a coupling means to the main body of the suspension unit. The main body is rounded so as to fit to the inner surface of a wind turbine tower. The suspension is illustrated with two ladder fittings (dotted).

Figure 7D:
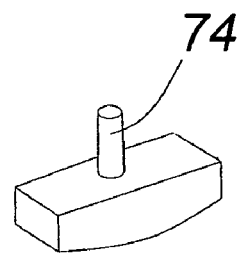

FIG. 7d illustrates a further one-point suspension. The illustrated suspension is slightly rounded for the purpose of fitting more accurate to a wind turbine tower, when fitted.

Figure 7E:
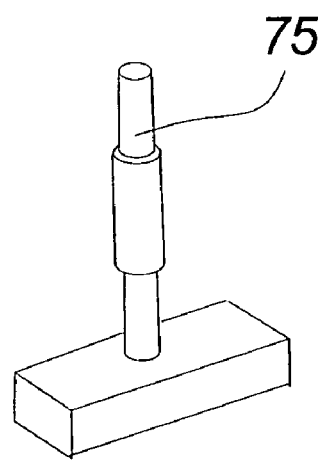

FIG. 7e illustrates a further one-point suspension. The illustrated suspension comprises a main body fitted with and arm 75 hinged at the one end to the suspension unit and at the other end facilitating a rigid attachment to mechanical structures. The arm 75 comprises a built-in spring/damper forming the coupling between the first and the further member according to the invention.

Figure 7F:
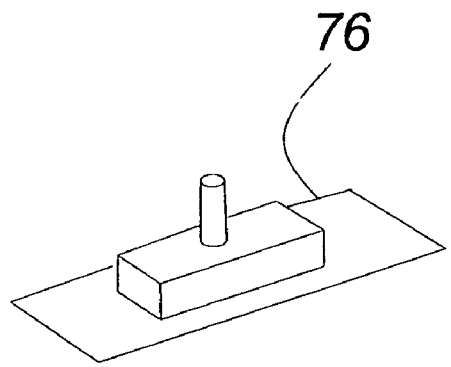

FIG. 7f illustrates a further one-point suspension according to an embodiment of the invention. The illustrated embodiment may basically comprise a main body substantially as described in FIG. 2a and the following figures mounted on a base plate 76. The base plate reduces the stress on the magnetic attraction between the suspension and the foundation when the directions of the forces are orientated other than in the direction of the normal forces (normal: with respect to the base plate).

Figure 8:
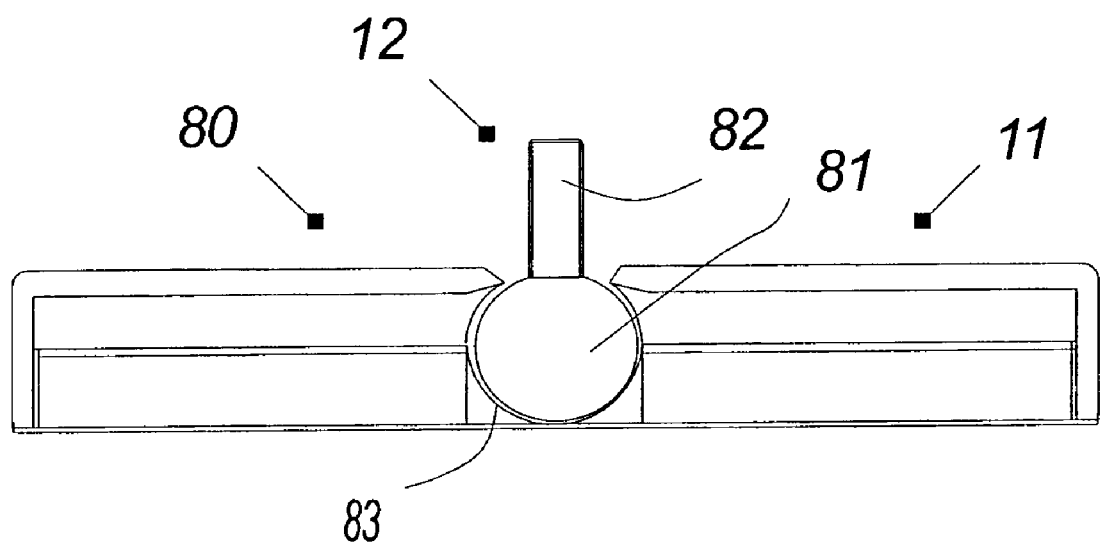
FIG. 8 illustrates a further embodiment of the invention.

FIG. 8 illustrates a further embodiment of the invention.

The illustrated embodiment comprises an arrangement being primarily adapted for reducing undesired static stress and the magnetic attachment induced due to slight misalignment or geometrically misfit between first main body of the suspension and the structures intended for attachment to the suspension. The illustrated embodiment of the invention comprises a main body, e.g. substantially as described in FIG. 2a or one of the other embodiments described in FIG. 7a-7f, in which a further member 12 is encapsulated for rotation by means of a conventional ball- and socket joint. The further member comprises a spherical body 81 held in a socket 83 and rigidly coupled with a projection 82. Mechanical structures may be fitted to the projection 82.

If a mechanical structure is fitted to the suspension, the further member will automatically be aligned to fit to the orientation of the fitting or the mechanical structures to be fitted to the projection 82. In this way, undesired static induction of "rotational" forces in the main body may be avoided. The coupling means according to the invention is here formed by the geometrically mutually fitting between the first and the further member.

Figures 9A, 9B:
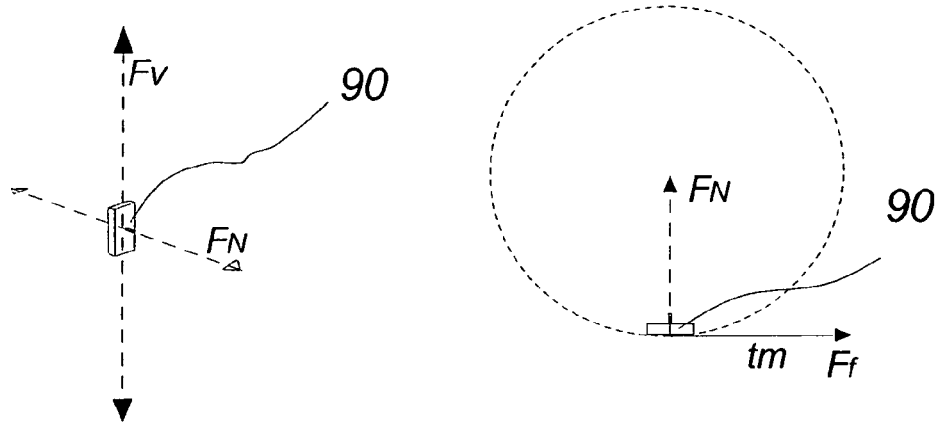
FIG. 9 illustrates the main force directions of an applicable attachment according to one embodiment of the invention.

FIGS. 9a and 9b illustrate two principal main force directions $F_V$ and $F_N$ acting on a suspension unit 90 in an attachment according to one embodiment of the invention.

Vertical fixation must counteract the vertical forces $F_V$ on the structure. Vertical forces to be counteracted may e.g. typically result from the gravity. According to the invention, such forces may both be counteracted by means of mechanical forces and by magnetically forces established between the suspension and the wind turbine tower. When dealing with heavy suspended structures, a typical application within the scope of the invention would imply traditional mechanical attachment in the vertical direction, e.g. with respect to ladders, etc.

Normal forces $F_N$ acting on the suspension unit 90 may according to the invention preferably be counteracted by means of magnetic attraction. The magnetic attraction in the normal force direction (numerically) may be exploited further, if friction members are applied between the suspension unit 90 and the corresponding magnetic tower portion. Hence, according to well-known relationships between normal force $F_N$ and the frictions, transverse force is established to counteract e.g. rotational movements (tangential movement tm) of e.g. a platform or a ladder suspension.

Figure 10:
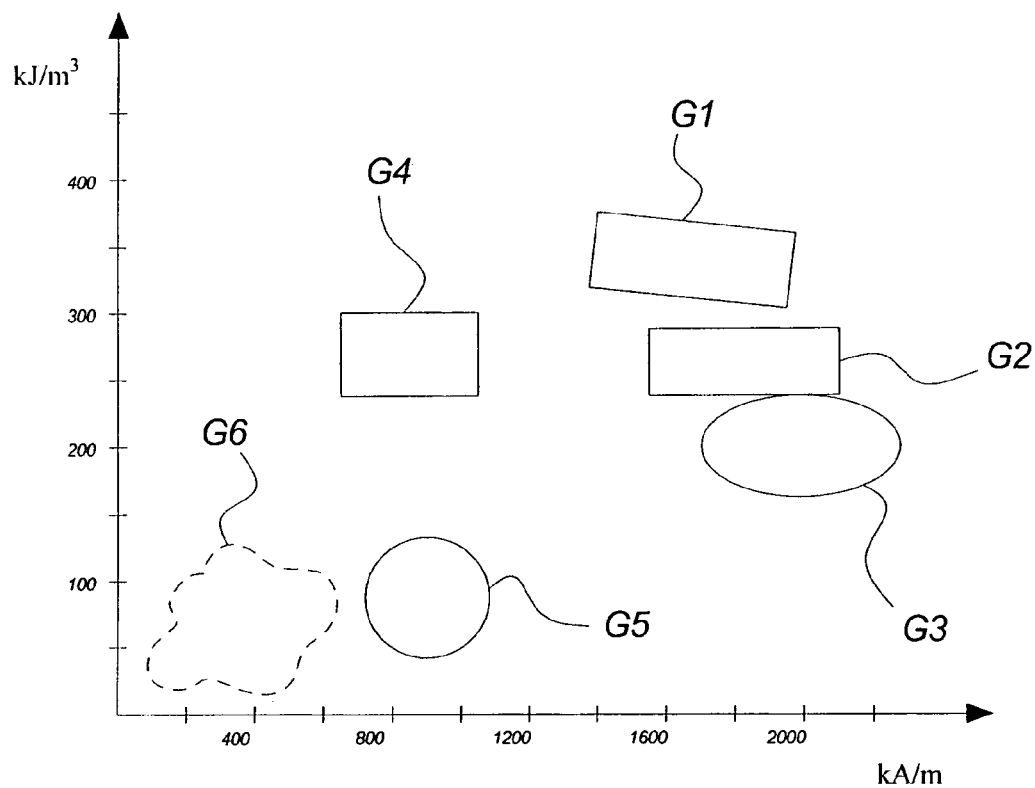
FIG. 10 illustrates the properties of permanent magnetic materials FIG. 11. illustrates coupling means according to one embodiment of the invention.

FIG. 10 illustrates some of the properties of different permanent magnetic materials.

The illustrated diagram illustrates the behavior of six groups of magnetic materials, G1 to G6 at a temperature of approximately 20 degrees Celsius. The x-axis represents HcJ (Coercivity [kA/m] and the y-axis represents maximum energy product $|BH|_{max}$. [kJ/m$^3$], where $|BH|_{max}$ represents the energy potential of the material, whereas HcJ represents the material's ability to resist demagnetizing fields.

Group G1 comprises so-called Neodym magnets, NdFeB. The Neodym magnets are some of the most powerful permanent magnets on the market.

Groups G2 and G3 comprise $Sm_xCo_y$ magnets characterized by a high degree of stability with respect to variation in temperature. Group G2 refers to $Sm_2Co_{17}$ and Group G3 refers to $SmCo_5$.

Group G4 refers to a further group of so-called low $H_c$-$Sm_xCo_y$ magnets, $Sm_2Co_{17}$.

Group G5 comprises a group of plastic-bounded Neodym magnet material NdFeB.

Finally, group G6 comprises more traditional magnet materials such as Alnico and FeSr/FeBa materials.

Different magnetic materials may be applied in a suspension unit according to the invention.

According to a preferred embodiment of the invention, the applied permanent magnetic materials are primarily selected from materials featuring a high-energy potential $|BH|_{max}$. Hence, according to a preferred embodiment of the invention, the materials are chosen from group G1, i.e. the Neodym magnets.

Evidently, if for instance temperature variations become critical, Samarium-Cobalt magnets may be preferred.

According to the invention, suspension units may e.g. be combined with units having magnets from different groups, thereby creating a degree of redundancy.

Figure 11:
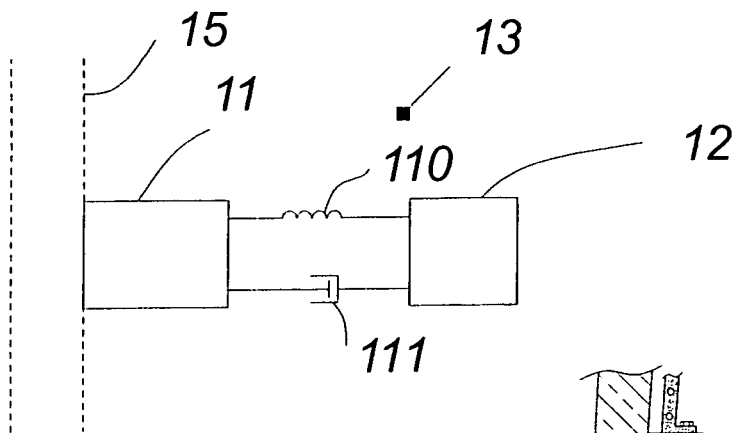

FIG. 11 illustrates one of several applicable types of coupling means between the first member 11 a further member 12 within the scope of the invention.

According to the illustrated embodiment, the first member 11 (as described in FIG. 1) is magnetically and rigidly attached to a foundation. The further member 12 is coupled to the first member 11 by means of a coupling means 13 comprising a damper 110 and an elastic member 111 in parallel. Numerous other configurations of mass/damper/spring systems may form the coupling means according to the invention. The above-illustrated embodiment should in no way be regarded as the only embodiments applicable within the scope of the invention. Several other embodiments may be applied.

Figure 12:
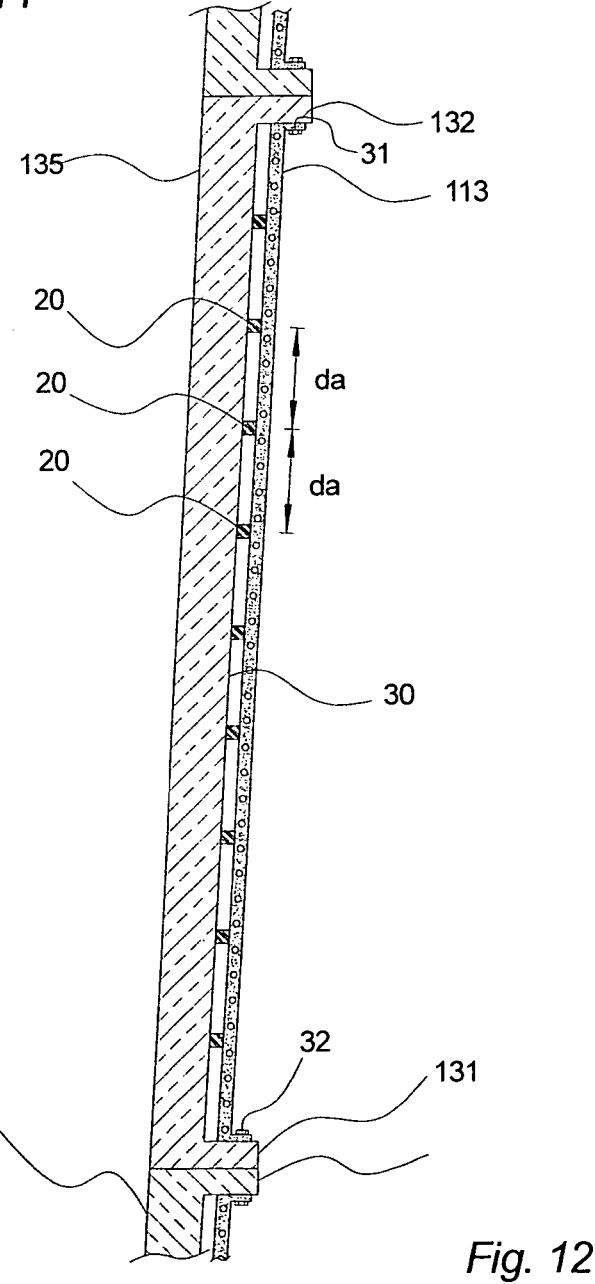
FIG. 12 illustrates a cross-section of a wind turbine tower section according to one embodiment of the invention.

FIG. 12 illustrates an advantageous embodiment of the invention.

The figure illustrates a cross-section of a wind turbine tower section 131. According to the illustrated embodiment, a ladder 113 is fixated to the inner surface 30 of the wind turbine tower section 13. The ladder is suspended mechanically in two suspensions to the tower section, an upper mechanical suspension 31 and a lower mechanical suspension 32.

Bolting, welding, etc may e.g. obtain the suspension of the ladder to the tower. Moreover the ladder is suspended in the tower by means of a number of wind turbine suspension units 20, e.g. illustrated in FIG. 2a and FIG. 8, or derivatives thereof.

The units 20 are attached to the inner surface by means of magnetic forces established by the magnets of the units 20, and the ladder may be attached to the units 20 e.g. by means of the fittings 22 of the units 20.

Basically, it may be appreciated that the main fixation in the vertical direction is obtained by means of mechanical end-point fixation to the tower, the upper flange 132 and lower flange 131 of the tower section 31, while the transverse fixation (i.e. the non-vertical) is obtained magnetically by means of the units 20.

According to the illustrated embodiment the vertical mechanical stress is primarily created by traditional mechanical attachment to the tower, e.g. by welding and/or bolting, while fixation of the ladder 31 is primarily obtained by magnetic fixation to the inner surface 30 of the tower section 13.

The distance between the suspension units 20 in the vertical direction may e.g. be between 0.5 meter and 4 meters depending on the requirements to the fixation. A preferred vertical distance is between 1.5 to 2.3 meters. Evidently, a suspension unit according to the invention may be applied for fixation of several other interior components than the illustrated ladder.

According to a further embodiment of the invention, a ladder construction may e.g. be fixated to the tower by the above-described provisions and the further interior components such as lamps, power cables, generators, etc. may then be fixated to the ladder construction itself by traditional attachment mechanics, welding, bolting etc.

Today, most modern wind turbine towers are conical tubular steel towers. Typically, modern tower weights are 40 metric tonnes for a 50 m tower for a turbine with a 44 m rotor diameter (e.g. a 600 kW wind turbine), and 80 metric tonnes for a 60 meters tower for a 72 m rotor diameter (e.g. a 2000 kW wind turbine). The illustrated tower may e.g. be an 80 (eighty) metric tonnes tower. The lower and upper diameters may e.g. be approximately 4.2 meters and 2.3 meters, respectively. It should be emphasized that the illustrated wind turbine tower and the illustrated choice of dimensions should in no way be regarded as restriction of the invention to the illustrated tower.

A platform within a wind turbine tower may e.g. be attached at the end portion of the towers, e.g. flanges, by means of wires fixed to the platform at the lower end and to the flanges at the upper end. Thus, vertically, the platform is mechanically attached to the flange and hanging in the wires, whereas the platform comprises permanent magnetic suspension units providing magnetic fixation of the platform with respect to non-vertical excitation forces of the platform.

The invention claimed is:

1. A system, comprising:
   a plurality of tower sections serially connected forming a wind turbine tower; and
   a suspension arrangement coupling an element to the wind turbine tower, said suspension arrangement including at least one suspension unit magnetically attached to the wind turbine tower, each said suspension unit comprising:
   at least one first member comprising a U-shaped cover and magnetic attachment means magnetically attached to the wind turbine tower; and
   at least one further mechanical member being mechanically coupled to said first member by means of at least one coupling means, said at least one further mechanical member having a first portion anchored in the U-shaped cover and a second portion extending from said first member and projecting through said cover;
   wherein said coupling means is configured to allow said at least one further mechanical member to be movable in at least one direction relative to said magnetic attachment means while said at least one first member is magnetically attached to the wind turbine tower; and
   wherein said at least one further mechanical member is coupled to the element and thereby provides coupling between the element and the wind turbine tower.

2. The system according to claim 1, wherein said magnetic attachment means comprises a permanent magnetic material.

3. The system according to claim 1, further comprising at least one barrier encapsulating said magnetic attachment means completely or partly.

4. The system according to claim 1, wherein said wind turbine tower suspension arrangement comprises means for receiving mechanical attraction forces in at least one first direction and means for establishment of magnetic attraction forces in at least one other direction, said at least one other direction being substantially transverse in relation to said at least one first direction.

5. The system according to claim 1, wherein said wind turbine tower suspension arrangement comprises ladder fixating means.

6. The system according to claim 1, wherein said wind turbine tower suspension arrangement comprises platform fixating means.

7. The system according to claim 1, wherein said wind turbine suspension arrangement comprises cable fixating means.

8. The system according to claim 1, wherein said wind turbine suspension arrangement comprises illumination fixating means.

9. The system according to claim 1, wherein the element coupled to the wind turbine tower includes a ladder.

10. The system according to claim 1, wherein the element coupled to the wind turbine tower includes a cable.

11. The system according to claim 1, wherein the element coupled to the wind turbine tower includes an illumination means.

12. The system according to claim 1, wherein the at least one coupling means comprises a hinged connection.

13. The system according to claim 1, wherein the at least one coupling means comprises a vibration absorbing element.

14. The system according to claim 13, wherein the vibration absorbing element comprises an elastic member.

15. The system according to claim 13, wherein the vibration absorbing element comprises at least one mass.

16. The system according to claim 13, wherein the vibration absorbing element comprises a damper.

17. The system according to claim 1, wherein the at least one coupling means comprises a ball and socket joint.

* * * * *